United States Patent [19]
Mitomo et al.

[11] Patent Number: 5,672,553
[45] Date of Patent: Sep. 30, 1997

[54] SUPERPLASTIC SILICON NITRIDE SINTERED BODY

[75] Inventors: Mamoru Mitomo, Ushiku; Hideki Hirotsuru, Omuta; Hisayuki Suematsu; Toshiyuki Nishimura, both of Tsukuba, all of Japan

[73] Assignee: National Institute for Research in Inorganic Materials, Tsukuba, Japan

[21] Appl. No.: 699,690

[22] Filed: Aug. 15, 1996

Related U.S. Application Data

[63] Continuation of Ser. No. 383,835, Feb. 6, 1995, abandoned.

[30] Foreign Application Priority Data

Jun. 30, 1994 [JP] Japan .................. 6-173189

[51] Int. Cl.⁶ ............................................ C04B 35/587
[52] U.S. Cl. ........................... 501/97; 501/92; 501/98
[58] Field of Search ......................... 501/97, 98, 92

[56] References Cited

U.S. PATENT DOCUMENTS

| | | | |
|---|---|---|---|
| 5,122,485 | 6/1992 | Akimore | 501/92 |
| 5,204,297 | 4/1993 | Yamamoto et al. | 501/97 |
| 5,352,641 | 10/1994 | Matsui et al. | 501/97 X |
| 5,556,815 | 9/1996 | Boberski et al. | 501/97 |

*Primary Examiner*—Karl Group
*Attorney, Agent, or Firm*—Oblon, Spivak, McClelland, Maier & Neustadt, P.C.

[57] ABSTRACT

A superplastic silicon nitride sintered body which is a sintered body of silicon nitride and which has superplasticity such that when a compression or tensile stress of from 30 to 2000 kg/cm² is applied thereto at a temperature within a range of from 1350° to 1650° C., it deforms at a deformation rate of from $10^{-4}$/sec to $10^{-1}$/sec.

6 Claims, No Drawings

SUPERPLASTIC SILICON NITRIDE SINTERED BODY

This application is a continuation of application Ser. No. 08/383,835, filed Feb. 6, 1995, now abandoned.

BACKGROUND OF THE INVENTION

1. Field of the Invention

This invention relates to a superplastic silicon nitride sintered body. More particularly, this invention relates to a silicon nitride sintered body having superplasticity, which makes it possible to produce by superplastic shaping a ceramic machine part which is useful in the field of a semiconductor-producing machine, a chemical plant, a non-ferrous metal-producing machine, a welding robot or the like.

2. Discussion of Background

Ceramics are known to have excellent properties such as high strength and high hardness at both low and high temperatures. On the other hand, such ceramics have a problem that it is difficult to process them when they are to be made into machine parts or the like. Majority of metal materials are easy to cut by a lathe and can finally be ground or polished. Accordingly, in the case of metal materials, shaping costs are not so high. Whereas, in the case of ceramics, cutting by a lathe is impossible, and diamond is required for their grinding or polishing, and such diamond wears off rapidly. Accordingly, shaping costs may amount more than one half of the price of the parts.

To reduce such processing costs of ceramics, it is desirable to produce them in a shape and size as close as possible to the designed shape and size. For this purpose, near-net shaping has been proposed.

However, when it is attempted to produce by sintering a high strength part which is useful as a machine part, a shrinkage of from 15 to 20% occurs, and it is therefore extremely difficult to produce a precision part by sintering.

Therefore, a study is now being actively made to utilize superplasticity to produce a part by post-sintering shaping. This is intended to utilize a phenomenon that a sintered body made of super-fine grains can readily be deformed under an external stress. Up to now, materials which are almost practically useful, have been developed with respect to oxide ceramics such as alumina, mullite or zirconia.

On the other hand, with respect to silicon nitride which is expected to be practically useful in many fields as machine parts for high temperatures, it has been difficult to realize a sintered body having superplasticity.

For example, it has been proposed to control the grain growth of silicon nitride by dispersing fine powder of silicon carbide to produce a nano-composites (Japanese Patent Application No. 335063/1989). However, with this sintered body, the deformation rate under a stress of from 200 to 500 kg/cm$^2$ is at a level of $10^{-5}$/sec even at 1650° C., and a deformation rate of such a level is so small that it takes a long time for processing, such being impractical. To carry out adequate processing, a higher temperature is required, whereby there will be a problem that the surface undergoes thermal decomposition by the high temperature processing.

On the other hand, as a solid solution of silicon nitride, a composite sialon composed of two phases of α-sialon and β-sialon grains has also been reported in J. Am. Ceram. Soc., vol 75, p. 1073 (1992). Such α- and β-sialon composites are the ones having different metal solid solution which stabilized α-form silicon nitride and β-form silicon nitride, respectively. Using α-powder as the starting material, sintering is carried out at a temperature as low as possible to suppress the grain growth. The composite sialon composed of such two phases, exhibits a deformation rate of about $7 \times 10^{-4}$/sec under a compression stress of 600 kg/cm$^2$ at 1550° C.

However, as a problem common to the above-mentioned silicon nitride sintered bodies, this composite sialon undergoes work-hardening for two reasons such that different kinds of interfaces are present between different grains and that the microstructure is still being developed. Work-hardening is based on a phenomenon that grains grow during the deformation, and it is necessary to increase the stress to maintain a constant deformation rate. Because of such work-hardening, also in the case of the composite sialon, it has been difficult to avoid problems such that deformation ceases to proceed, and the grain boundaries rupture thus leading to fracture of the material.

SUMMARY OF THE INVENTION

As mentioned above, with conventional silicon nitride sintered bodies, the temperature required for plastic shaping has been too high, or superplastic shaping has been practically impossible because of work-hardening.

Under these circumstances, the present inventors have conducted extensive studies to overcome such conventional problems and, as a result, have found that the reason why superplasticity is not adequately obtainable with a silicon nitride sintered body, is such that a conventional sintered body is still in an intermediate stage of sintering, and accordingly, the microstructure is non-uniform, and grain growth takes place in the subsequent processing steps.

It has further been found that a conventional silicon nitride sintered body is composed of two or more solid phases to retard grain growth, but the properties of the grain boundaries are non-uniform, whereby the grain boundaries are likely to be separated during the deformation, thus leading to fracture of the material.

Namely, commercially available conventional highly pure fine silicon nitride powders are composed mainly of α-form powders which are stable at low temperatures. Accordingly, starting materials for silicon nitride sintered bodies, which have been studied heretofore, are α-form powders. Such α-form powders undergo a phase transformation to β-form during liquid phase sintering. During this process, they undergo grain growth, but the phase transformation proceeds in a short period of time within a narrow temperature range, whereby the particle sizes will not be uniform. Further, in some cases, the sintering ceases to proceed before complete transformation, whereby α-form powders tend to partially remain. These are the major causes for work-hardening.

If a powder composed mainly of such a low temperature stable α-form is used as the starting material, formation of a small amount of abnormally grown grains is unavoidable. Therefore, a sintered body made of two or more phases has been developed as mentioned above. However, in this case, the sinterability decreases, and sintering is required to be conducted at a high temperature, whereby the average grain size tends to increase, and the increase in the stress and the temperature for superplastic shaping tend to be problematic.

Accordingly, to make superplastic shaping possible, it is necessary that a silicon nitride sintered body has a fine and uniform microstructure. Most of silicon nitride grains in a sintered body are of a β-form, and their average grain size is therefore fine, and the grain size distribution is narrow.

Accordingly, if the microstructure is uniform, a driving force for grain growth will be small. Namely, even when such a sintered body is subjected to superplastic deformation by applying a compression or tensile stress thereto at a high temperature, no substantial grain growth will take place, and the degree of work-hardening can be minimized. The present invention has been accomplished on the basis of these discoveries.

That is, the present invention provides a superplastic silicon nitride sintered body which is a sintered body of silicon nitride and which has superplasticity such that when a compression or tensile stress of from 30 to 2000 kg/cm$^2$ is applied thereto at a temperature within a range of from 1350° to 1650° C., it deforms at a deformation rate of from $10^{-4}$/sec to $10^{-1}$/sec.

DETAILED DESCRIPTION OF THE PREFERRED EMBODIMENTS

The range of the stress to be applied, is determined depending upon the deformation temperature and the deformation rate, and the stress may be small when the temperature is high or the deformation rate is low. On the other hand, when the temperature is low or the deformation rate is high, a large stress is required. However, as long as the stress is within the above-mentioned range of from 30 to 2000 kg/cm$^2$, shaping can be carried out by means of a usual processing apparatus. Thus, the superplastic silicon nitride sintered body of the present invention is practically useful. With a view to obtaining excellent processability, the compression or tensile stress is preferably within a range of from 100 to 1000 kg/cm$^2$.

The upper limit of the processing temperature is determined by the thermal stability of the material. In the case of the superplastic silicon nitride sintered body of the present invention, if the temperature exceeds 1650° C., thermal decomposition will result, and the surface tends to be roughened, such being undesirable. With respect to the lower limit of the deformation temperature, superplastic deformation can not be realized at a temperature lower than 1350° C., taking into consideration of the phenomenon of plastic deformation wherein grains will slide by means of a glassy phase at grain boundaries.

The lower limit of the deformation rate is a limit for superplasticity to be suitable for shaping, and if the deformation rate is lower than $10^{-4}$/sec, the processing time tends to be so long that such will not be practically useful. On the other hand, if the deformation rate exceeds the upper limit of $10^{-1}$/sec, the deformation tends to be so quick that precision processing will be difficult, and at the same time, it will be required to increase the processing temperature to a level substantially higher than the upper limit of 1650° C., whereby the thermal stability will be impaired. If the deformation temperature is set at 1650° C., the stress will exceeds the above range, whereby the processing costs will be high.

More specifically, to realize the above-mentioned superplasticity, the present invention provides the silicon nitride sintered body which has a relative density of at least 98% and wherein the average grain size of silicon nitride is at most 0.3 µm, the amount of grains having grain sizes within the range of the average grain size ±0.2 µm is at least 85 vol %, the amount of grains having grain sizes exceeding 0.5 µm is at most 3 vol %, and the amount of the grain boundary phase is from 2 to 20 vol %.

In the superplastic silicon nitride sintered body of the present invention, the relative density is at least 98%, the average grain size of silicon nitride grains is at most 0.3 µm, the amount of grains having grain sizes within a range of the average grain size ±0.2 µm is at least 85 vol %, and the amount of grains having grain sizes exceeding 0.5 µm is at most 3 vol %. Within these ranges, the grains are fine, and the sintered body has a uniform microstructure. Further, the sintered body will undergo no substantial grain growth even when heated at a high temperature by sintering or even under a condition where a stress is exerted at a high temperature such as creeping. Outside the above ranges, a driving force for grain growth will increase, and a part of grains tend to undergo abnormal growth during sintering, whereby it will be difficult to obtain a uniform microstructure.

Measurement of the grain sizes can be conducted in such a manner that a sintered body is cut, polished and then subjected to plasma etching by means of $CF_4$ gas, whereupon the grains are inspected. By this treatment, silicon nitride grains will be shallowly removed, and an oxide glass phase at the grain boundaries will remain. Such a treated sample is inspected by a scanning electron microscope (SEM), whereby the contrast between the grains and the grain boundaries becomes clear, whereupon the shapes of the grains can be observed. Thereafter, from the SEM photograph, at least 500 grains will be statistically treated by an image analysis. By this image analysis, the two dimensional information of the cross section will be analyzed.

And, with respect to each grain, the diameter, the length and the area will be measured. The grain size corresponds to the shortest diameter of a grain on the polished surface, and the average grain size ($D^{50}$) is obtained as a number average of many values actually measured.

The proportion, i.e. the vol %, of grains belonging to a certain grain size range in the entire amount, can be calculated from the relation between the measured particle sizes and the cumulative areas, because the ratios of the surface areas in the polished surface correspond to the ratios of the volumes in the sintered body. Thus, the amount (vol %) of grains having grain sizes within the range of $D_{50} \pm 0.2$ µm and the amount (vol %) of grains having grain sizes exceeding 0.5 µm can be calculated.

Since grains are three dimensionally randomly oriented, their lengths observed on the polished surface tend to be usually smaller than the actual lengths, and the lengths of only grains oriented in parallel with the polished surface agree with the actual lengths.

Therefore, in the case of the superplastic silicon nitride sintered body of the present invention, the ratio of length/diameter is measured for every grain and is taken as a shape factor of the grain. As mentioned above, this ratio of length/diameter may be different from the real value of the grain, but with a microstructure composed of uniform and almost spherical grains, the difference of this ratio from the real value will be small. Here, the ratio of length/diameter is referred to as an aspect ratio of a grain, and by specifying this aspect ratio, it is possible to define a grain structure which is fine and uniform.

In the superplastic silicon nitride sintered body of the present invention, it is preferred that the number of silicon nitride grains having aspect ratios of less than 3 is at least 90% of the total number of silicon nitride grains. Grains having aspect ratios of 3 or more have large anisotropy and a large driving force for grain growth, whereby such grains have a higher possibility that they serve as nuclei for abnormal grain growth. Further, if β-particles constitute at least 90 vol % of the total silicon nitride grains, the microstructure can be maintained more uniformly.

Further, in the superplastic silicon nitride sintered body of the present invention, the amount of the grain boundary phase is from 2 to 20 vol %. This grain boundary phase is an oxide-rich phase containing a sinter-assisting agent to be used for the preparation of the silicon nitride sintered body and an unavoidable component such as $SiO_2$, $Si_3N_4$ or the like. The sinter-assisting agent will more or less remain at the grain boundary after sintering. If such a grain boundary phase is less than 2 vol %, it tends to be difficult to produce a high density sintered body having a relative density of at least 98%, and the resulting product tends to hardly undergo plastic deformation. On the other hand, if it exceeds 20 vol %, the mechanical properties of the sintered body tend to be inferior. Preferably, the grain boundary phase is within a range of from 4 to 10 vol %.

Sinter-assisting agents may be classified into a liquid phase-forming agent which reacts with silicon nitride or with silica ($SiO_2$) as the surface oxidized phase, to form a liquid phase, and a melting point-reducing agent which lowers the temperature for the formation of the liquid phase. Both types of sinter-assisting agents may be used for the superplastic silicon nitride sintered body of the present invention.

As the liquid phase-forming component, a composition consisting essentially of at least one member selected from the group consisting of $Al_2O_3$, MgO, $Sc_2O_3$ and oxides of yttrium and lanthanide metals, may, for example, be mentioned. Further, as the melting point-reducing component, a composition consisting essentially of at least one member selected from the group consisting of CaO, SrO, MgO, BaO and $Al_2O_3$, may, for example, be mentioned. For the preparation of the sintered body, at least one member of these components is mixed with silicon nitride, so that the mixture will be used as the starting material. The reason why the same compound is contained in both the above-mentioned liquid phase-forming component and the melting point-reducing component is that its function is different depending upon the co-existing oxide.

When the above-mentioned relative density, average particle size and proportions are satisfied, the silicon nitride sintered body exhibits superplasticity such that it deforms at a deformation rate of from $10^{-4}$/sec to $10^{-1}$/sec when a compression or tensile stress of from 30 to 2000 kg/cm$^2$ is applied thereto within a temperature range of from 1350° to 1650° C.

Even if the superplastic silicon nitride sintered body of the present invention contains fine silicon carbide powder of at most 0.3 µm i.e. having an average particle size equal to or smaller than silicon nitride in a small amount of from 1 to 10 wt %, the sinterability or superplasticity will not be substantially affected. However, if the amount of such silicon carbide exceeds 10 wt %, sintering will be hindered, and the plastic deformation rate tends to be low. If the amount is less than 1 wt %, there will be no effect to the properties, but it will be difficult to determine the co-existence.

To produce the superplastic silicon nitride sintered body of the present invention, the above-mentioned sinter-assisting agent is added to a powder composed essentially of a β-form powder having an average particle size of from 0.05 to 0.40 µm and a specific surface area of from 15 to 60 m2/g, and the mixture is heated and sintered in a nitrogen atmosphere at a temperature of from 1400° to 1750° C., whereby a sintered body having a relative density of at least 98% will be obtained.

If the average particle size is smaller than 0.05 µm or if the specific surface area exceeds 60 m$^2$/g, the density of the formed product tends to be low, and grain growth will occur during the sintering, whereby it tends to be difficult to obtain a uniform microstructure. Further, if the average particle size is larger than 0.40 µm or if the specific surface area is smaller than 15 m$^2$/g, large particles which serve as nuclei for grain growth, will remain. Preferably, the average particle size is within a range of from 0.15 to 0.30 µm, and the specific surface area is within a range of from 20 to 35 m$^2$/g. Here, the average particle size means a particle diameter at a cumulative volume of 50%, and the relation between the particle diameter and the cumulative volume (%) is measured by a particle size analyzer.

As mentioned above, the sintering temperature is within a range of from 1400° to 1750° C. To suppress the grain growth, sintering is preferably conducted at a temperature as low as possible so long as high densification can be accomplished. Preferably, the sintering temperature is within a range of from 1450° to 1650° C. Addition of the above-mentioned sinter-assisting agent is preferred also to make sintering at such a low temperature possible. By the addition of the sinter-assisting agent, the liquid phase will form even at a low temperature, and it is possible to lower the melting point of the grain boundary phase. A sintered body wherein the grain boundary phase has a low melting point, is effective by virtue of the superplastic deformation.

Further, when a pressure is exerted in addition to the temperature, sintering will be promoted, and high densification at a low temperature can be accomplished. For this purpose, a hot-pressing (HP) or a hot-isostatic-pressuring (HIP) may be employed for the preparation of the superplastic silicon nitride sintered body of the present invention.

When the sintering time is short, grain growth is not so remarkable that it is possible to complete sintering in a short period of time at a temperature exceeding 1650° C.

The silicon nitride sintered body thus prepared is composed of fine and uniform grains and has a microstructure having a small driving force for grain growth, and it readily undergoes superplastic deformation.

Now, the superplastic silicon nitride sintered body of the present invention will be described in further detail with reference to Examples. However, it should be understood that the present invention is by no means restricted by such specific Examples.

EXAMPLES 1 to 3

A 0.3 wt % sodium hexametaphosphate aqueous solution was added to a silicon nitride powder of a high β-ratio (SN-P21FC, manufactured by Denki Kagaku Kogyo K.K.) commercially available as a starting material for sintering, so that the slurry concentration would be 10 wt %, and the mixture was dispersed and pulverized in a wet system for 3 hours by a ball mill made of silicon nitride. Then, the obtained slurry was centrifugally separated for 5 minutes under a centrifugal force of 1400G to separate a slurry as a supernatant containing fine powder of silicon nitride. This slurry was washed and dried to obtain a starting powder. The β-ratio determined by the powder X-ray diffraction was 95%. The average particle size of the powder was 0.28 µm as measured by a laser scattering method. The specific surface area was 22.6 m$^2$/g as measured by a nitrogen absorption method.

To 93 wt % of the above silicon nitride powder, 3 wt % of MgO (guaranteed reagent), 2 wt % of $Al_2O_3$ (purity: 99.99%) and 3.6 wt % of $CaCO_3$ (guaranteed reagent) were added, and the mixture was wet-mixed for 3 hours in hexane, then dried and pulverized. Here, $CaCO_3$ was added, because $CaCO_3$ will be thermally decomposed by the high temperature in the subsequent sintering step, to form CaO, which in turn serves as a component effective for lowering the melting point of the liquid phase.

Then, about 2.5 g of this powder was filled in a 10 mmφ carbon die and sintered by hot-pressing in a nitrogen atmosphere under a pressure of 200 kg/cm². For the sintering, the temperature was raised to 1650° C. at a rate of 30° C./min, and then the electric source was shut off for natural cooling without maintaining the temperature. With respect to the obtained sintered body, the density of the sintered body was measured by an Archimedes method, whereby the relative density was 98.7%. Further, by the powder X-ray diffraction, it was confirmed that silicon nitride in the sintered body was all β-form.

Further, the obtained sintered body was cut and polished to a mirror surface, and the polished surface was subjected to plasma etching, whereupon the microstructure of the sintered body was inspected by a scanning electron microscope (SEM). Further, evaluation of grains was carried out by an image analyzer (Luzex III, manufactured by Nireko Co.). With respect to at least 500 grains, the diameters of the grains, the grain lengths and the areas were measured, and an aspect ratio (length/diameter) was calculated for every grain. The average grain size, the proportion (vol %) of grains having grain sizes within a range of the average grain size ±0.2 μm, and the proportion (vol %) of grains having grain sizes exceeding 0.5 μm, were 0.12 μm, 93.5% and 0%, respectively. The aspect ratios of the respective grains were summarized, whereby the number of grains having aspect ratios of at least 3 was 0.5%. The microstructure was found to be fine and uniform.

The obtained sintered body having a diameter of 10 mm and a length of 10 mm was compressed under a compression stress as identified in Table 1, whereby the deformation rate was measured. As shown in Table 1, this sintered body readily undergoes superplastic deformation, and it was confirmed that this sintered body can be shaped by superplastic deformation. After the deformation, there was no change in the density or the microstructure, and there was no deterioration in the mechanical properties.

TABLE 1

|  | Deformation temperature (°C.) | Deformation stress (kg/cm²) | Deformation (distortion) rate (/sec) |
| --- | --- | --- | --- |
| Example 1 | 1600 | 200 | $1.2 \times 10^{-3}$ |
| Example 2 | 1500 | 500 | $9 \times 10^{-4}$ |
| Example 3 | 1450 | 800 | $7 \times 10^{-4}$ |

EXAMPLES 4 to 6

To the fine powder of β-form silicon nitride prepared by pulverization and classification in the same manner as in Examples 1 to 3, a sinter-assisting agent as identified in Table 2 was added, and the mixture was mixed and dried in the same manner as in Examples 1 to 3 and subjected to hot-pressing in a nitrogen atmosphere under a pressure of 200 kg/cm². For this sintering, the temperature was raised to a level as identified in Table 2 at a rate of 30° C./min, and then the electrical source was shut out for natural cooling without maintaining the temperature. The relative density of the sintered body was at least 99% in every case, and the grains were completely transformed to β-form. Further, the proportion of grains having grain sizes exceeding 0.5 μm was not more than 3 vol % in each Example.

In Examples 4 and 6, the deformation rate was measured under a compression stress, and in Example 5, the deformation rate was measured under a tensile stress. The results are shown in Table 2, whereby it was confirmed that the deformation rates were high, and the sintered bodies exhibited superplasticity.

TABLE 2

|  | Assisting agent (wt %) |  | Maximum temperature (°C.) | Relative density (%) | Average grain size ($D_{50}$, μm) | Proportion of $D_{50} \pm 0.2$ μm (%) | Deformation temperature (Applied pressure) (kg/cm²) | Deformation rate (/sec) |
| --- | --- | --- | --- | --- | --- | --- | --- | --- |
| Example 4 | MgO | (2) | 1700 | 99.0 | 0.23 | 89.5 | 1500 (500) | $4 \times 10^{-4}$ |
|  | $Y_2O_3$ | (5) |  |  |  |  |  |  |
| Example 5 | SrO | (1) | 1700 | 99.1 | 0.21 | 93.4 | 1450 (500) | $1.2 \times 10^{-3}$ |
|  | $Al_2O_3$ | (2) |  |  |  |  |  |  |
|  | $Nd_2O_3$ | (5) |  |  |  |  |  |  |
| Example 6 | MgO | (3) | 1650 | 99.3 | 0.16 | 95.0 | 1550 (1000) | $1.3 \times 10^{-2}$ |
|  | BaO | (1) |  |  |  |  |  |  |
|  | $CeO_2$ | (3) |  |  |  |  |  |  |

EXAMPLE 7

To a mixture of a fine powder of silicon nitride and a sinter-assisting agent, as prepared in the same manner as in Examples 1 to 3, a silicon carbide powder was mixed in an amount corresponding to 5 wt % of the silicon nitride. As this silicon carbide powder, a high purity β-form super-fine powder (T-1) manufactured by Sumitomo Cement Co., Ltd., was employed. The average particle size was 0.03 μm, and the specific surface area was 48 m²/g. The mixed powder was subjected to hot-pressing under the same conditions as in Examples 1 to 3 to obtain a sintered body having a relative density of 98.2%. This sintered body had an average particle size of 0.09 μm, and the proportion of grains having particle sizes within a range of the average particle size ±0.2 μm, was 99.9 vol %. To this sintered body, a compression stress of 500 kg/cm² was applied at 1550° C., whereby the deformation rate was measured and found to be $8 \times 10^{-4}$/sec. It was confirmed that superplastic forming was possible.

COMPARATIVE EXAMPLE 1

To a commercially available silicon nitride powder of a high α-ratio for sintering (SN-E10, manufactured Ube Industries Co.), the same sinter-assisting agent as used in Example 4 was mixed, and a sintered body was prepared in the same manner as in Example 1. The sintering temperature was 1750° C., and the time for maintaining the sintering temperature was 1 hour.

The sintered body was completely transformed to β-form and had a relative density of 99.5%. This sintered body had an average grain size of 0.24 μm, and the proportion of grains having grain sizes within a range of the average grain size ±0.2 μm was 78.5 vol %. Further, the proportion of grains exceeding 0.5 μm was 7.2 vol %, thus indicating a non-uniform grain structure, and the presence of large grains was observed. As compared with the sintered bodies obtained in Examples 1 to 7, the microstructure was inferior in the uniformity.

To this sintered body, a compression stress of 500 kg/cm² was applied at 1500° C., whereby the deformation rate was measured and found to be as small as $1.2 \times 10^{-6}$/sec, and the sintered body was not useful for superplastic shaping.

As described in the foregoing, according to the present invention, it is possible to realize a silicon nitride sintered body which undergoes a large deformation upon application of a compression or tensile stress and which is thus useful for superplastic shaping. The sintered body of the present invention is useful as a machine part to be used at high temperatures.

What is claimed is:

1. A superplastic, sintered silicon nitride body consisting of β-$Si_3N_4$, at least one sintering assistant and unavoidable minor components selected from the group consisting of $SiO_2$, $Si_3N_4$ and combinations thereof, said body having a grain boundary phase in an amount of 2–20 volume % and a relative density of at least 98%, said body formed of silicon nitride grains having an average grain size of at most 0.3 μm, the amount of grains having grain sizes within the range of the average grain size ±0.2 μm is at least 85 volume %, wherein at least 90% of the silicon nitride grains have an aspect ratio of less than 3 and the amount of grains having grain sizes exceeding 0.5 μm is at most 3 volume % and at least 90 volume % of the silicon nitride being in β-form, and wherein the superplasticity of the sintered silicon nitride body is such that when a compression or tensile stress of from 30–2000 kg/cm² is applied thereto at a temperature within the range of from 1350°–1650° C., said sintered body deforms at a deformation rate of from $10^{-4}$/sec to $10^{-1}$/sec.

2. The superplastic silicon nitride sintered body according to claim 1, wherein the sintered silicon nitride body is formed from a β-$Si_3N_4$ starting material having an average particle size of from 0.05 to 0.40 μm and a specific surface area of from 15–60 m²/g.

3. A superplastic, sintered silicon nitride body consisting of β-$Si_3N_4$, unavoidable minor components selected from the group consisting of $SiO_2$ and $Si_3N_4$, and at least one sintering assistant selected from the group consisting of a liquid phase forming agent and a melting point reducing agent, said liquid phase forming agent, which is $Al_2O_3$, MgO, $Sc_2O_3$, oxides of yttrium or oxides of a lanthanide metal, reacting with said $Si_3N_4$ and $SiO_2$ as a surface oxidized phase, thereby forming a liquid phase, and said melting point agent, which is CaO, SrO, MgO, BaO or $Al_2O_3$, lowering the temperature at which said liquid phase forms, said body having a grain boundary phase in an amount of 2–20 volume % and a relative density of at least 98%, said body formed of silicon nitride grains having an average grain size of at most 0.3 μm, the amount of grains having grain sizes within the range of the average grain size ±0.2 μm being at least 85 volume %, wherein at least 90% of the silicon nitride grains have an aspect ratio of less than 3 and the amount of grains having grain sizes exceeding 0.5 μm being at most 3 volume % and at least 90 volume % of the silicon nitride being in β-form, and wherein the superplasticity of the sintered silicon nitride body is such that when a compression or tensile stress of from 30–2000 kg/cm² is applied thereto at a temperature within the range of from 1350°–1650° C., said sintered body deforming at a deformation rate of from $10^{-4}$/sec to $10^{-1}$/sec.

4. The superplastic silicon nitride sintered body according to claim 3, wherein most of said at least one sintering agent is found at the grain boundary phase of the sintered body.

5. The superplastic silicon nitride sintered body according to claim 3, wherein the amount of said grain boundary phase ranges from 4 to 10 volume %.

6. The superplastic silicon nitride sintered body according to claim 1, wherein the amount of said grain boundary phase ranges from 4 to 10 volume %.

* * * * *